United States Patent [19]

Wagner et al.

[11] Patent Number: 5,895,809
[45] Date of Patent: Apr. 20, 1999

[54] METHOD OF PRODUCING PARTIALLY AROMATIC COPOLYAMIDES FROM AROMATIC DICARBOXYLIC ACID ESTERS

[75] Inventors: Harald Wagner, Freital, Germany; Joachim Ensinger, Thusis, Switzerland; Erich Krumpschmid, Gross-Umstadt, Germany

[73] Assignee: EMS-Polyloy GmbH, Gross-Umstadt, Germany

[21] Appl. No.: 08/800,290

[22] Filed: Feb. 13, 1997

[51] Int. Cl.⁶ .................................................. C08G 69/44
[52] U.S. Cl. .................. 528/322; 528/288; 528/310; 528/332; 528/335; 528/336; 528/480; 528/502 R
[58] Field of Search .................... 528/310, 322, 528/332, 502 R, 480, 288, 335, 336

[56] References Cited

U.S. PATENT DOCUMENTS

| 4,052,344 | 10/1977 | Crane et al. | 528/480 |
| 4,604,449 | 8/1986 | Jackson, Jr. et al. | 528/288 |
| 4,831,108 | 5/1989 | Richardson et al. | 528/335 |
| 4,978,743 | 12/1990 | Selbeck et al. | 528/499 |
| 5,218,080 | 6/1993 | Dellinger | 528/499 |
| 5,532,404 | 7/1996 | Gallagher | 560/78 |

FOREIGN PATENT DOCUMENTS

| 0 483 665 A2 | 5/1992 | European Pat. Off. |
| 0 497 662 A1 | 8/1992 | European Pat. Off. |
| 2 216 116 | 10/1973 | Germany |
| 271 823 A3 | 9/1989 | Germany |
| 32 21 341 C2 | 5/1992 | Germany |
| 42 21 969 A1 | 1/1994 | Germany |
| 1 049 987 | 11/1966 | United Kingdom |

OTHER PUBLICATIONS

A New Process for the Production of P–Phenylenediamine Alternatively from Polyester Waste, Terephthalic Ester, or Terephthalic Acid—Ind. Eng. Chem., Prod. Res. Dev., vol. 15, No. 3, 1976 (pp. 186–189).

Plastics Focus—An Interpretive News Report, vol. 26, No. 19, Monday, Sep. 26, 1994.

Chance or Risk for Pet Packaging—Recycling—How to Close the Loop in Western Europe –H.–W. Blumschein, Davos Recycle '92 International Forum and Exposition, Apr. 7–10, 1992 (pp. 2/6–1–2/6–18).

*Primary Examiner*—P. Hampton-Hightower
*Attorney, Agent, or Firm*—Hardaway Law Firm, P.A.

[57] ABSTRACT

The invention relates to a method of producing partially aromatic copolyamides from polymeric esters of aromatic dicarboxylic acids by amidation of the ester groups with diamines, removal of the split-off alcohols or diols and after-condensation of the low-molecular precondensates as well as by the following compounding to polyamide molding materials.

19 Claims, No Drawings

METHOD OF PRODUCING PARTIALLY AROMATIC COPOLYAMIDES FROM AROMATIC DICARBOXYLIC ACID ESTERS

SUMMARY OF THE INVENTION

The invention relates to the subject matter indicated in the patent claims.

The invention relates in particular to a novel method of producing partially aromatic copolyamides from polymeric esters of aromatic dicarboxylic acids, preferably from polyester recyclates or from polymerized polyester, e.g. accumulating in the production of PET as "waste", by amidation of the ester groups with diamines in the presence of aliphatic polyamides or their oligomers or monomers, appropriate posttreatment and further processing on the basis of the above-named, partially aromatic copolyamides, the copolyamide molding materials which can be produced by this novel method as well as the use of these copolyamide molding materials.

Thus, according to the invention even polyester waste, which can also stem from the production of polyesters, and regranulate produced therefrom can be used for the first time as new raw material for copolyamides. However, these materials can still contain oligomeric or monomeric esters which, however, do not adversely affect the method.

BACKGROUND OF THE INVENTION

Partially aromatic polyamides with terephthalamide- or isophthalamide units have been known in principle for several decades already; however, they did not become commercially available since the seventies on account of their demanding production methods. Methods and apparatuses for the production of high-melting, partially crystalline polyterephthalamides have even not been available until the middle of the eighties (e.g. the so-called "aerosol process" by AMOCO as described in U.S. Pat. No. 4,831,108).

Because the pure high-temperature polyamides (homopolymers) are very difficult to manage on account of their high melting point, usually, copolyamides derived therefrom with reduced melting point (or even amorphous ones, depending on the molar ratio) are produced such as e.g. PA 6T/6I or PA 6T/66 or PA 6T/6, which are only partially aromatic (as regards the amount of dicarboxylic acid) and which, however, also offer interesting possibilities of industrial use.

Theoretically, a plurality of different, partially aromatic copolyamides from aromatic dicarboxylic acids, diamines as well as lactams (respectively ω-aminoacids) are available. However, all previously known production methods share the common feature that the above-mentioned components are used as such in pure, monomeric form as raw material and that dicarboxylic acid(s) and diamine(s) are purposefully converted in a solution container connected in front of the polycondensation reactor at first in approximately equimolar amounts to aqueous, optionally lactam-containing "nylon" saline solutions.

Apart from the above paragraph and at first apparently without a connection to the end product striven for, there is a known problem in another area of polymer use: In the bottling of beverages, especially for carbonated soft drinks, user-friendly polyester bottles have largely displaced glass bottles. The problem of recycling arises for the large number of non-returnable bottles and also for worn-out returnable bottles because the pile of household waste should not be additionally enlarged by polyester bottles and on the other hand polyester bottles constitute in principle a valuable raw material. Various concepts for the collection and reuse of polyester bottles have already been developed and partially introduced such as is presented, e.g., in the lecture of H.-W. Blumschein: "Chance or Risk for PET-Packaging, -Recycling-, How to Close the Loop in Western Europe" (Davos Recycle '92, International Forum and Exposition, Apr. 7–10, 1992). In addition to the purely mechanical comminution, purification and reuse (flakes or regranulate for fibers, etc.) this lecture also describes chemical recycling methods such as e.g. methanolysis or glycolysis, which comprise the complete degradation of the polymer down to the monomers. Because the monomers may be reused to produce polyester for grocery packagings it is possible to close the circuit in this manner; however, this is not the most economical way to reuse material. In particular, the purification of the recycling monomers is expensive in this method. An example of this is the method described in EP 0,497,662 A1 for the production of pure terephthalic acid from PET waste. This method comprises the depolymerization of PET chips with pure sodium hydroxide, the dissolving of sodium terephthalate in water with subsequent purification in a special activated-carbon—adsorption/regeneration process, precipitation of terephthalic acid with sulfuric acid as well as filtering off, washing and drying the pure terephthalic acid. In addition to the high expense the method has two serious disadvantages: A large amount of sodium sulfate, which must be disposed of, as byproduct and the resulting terephthalic acid is very fine-grained on account of the precipitation at a relatively low temperature in comparison to commercial terephthalic acid and is therefore difficult to handle.

DE 32 21 341 C2 describes a depolymerization method of PET waste with neutral hydrolysis and simultaneous activated carbon purification. The disadvantage of this method resides in the high pressure necessary (high-pressure container) and the relatively long residence times.

In order to circumvent the expensive detour via the decomposition into monomers, suggestions have been made for preparing polyester waste by suitable methods directly for reuse. EP 0,483,665 A2 describes a method in which the PET waste is melted, filtered and in the last step after-condensed either in melt phase or solid phase to a higher (or original) molecular-weight level. Such higher-valency [higher-analysis] PET regranulate can be used after extrusion together with original raw material in the middle layer of foils.

According to a report in Plastic Focus, Vol. 26, No. 19, Sep. 26, 1994, a similar, improved method ("super cleaning") apparently succeeded in achieving a recycling PET quality which can be used in direct contact with groceries. In spite of this breakthrough one must realize that the circuit can never by completely closed in this way, that is, to approximately 100% and that "virgin" granulate must always be admixed for the high requirements of purity placed on grocery and beverage packagings because in organic material like PET degradation reactions always occur at the melt temperatures which impair the quality. Therefore, for a part of the recycling polyester further possibilities of use should be sought in addition to the use for other polyester applications.

A first attempt to produce other products from polyester waste is described in H. G. Zengel, M. J. Bergfeld: A new process for the production of p-phenylenediamine alternatively from polyester waste, terephthalic ester, or terephthalic acid; Ind. Eng. Chem., Prod. Res. Dev., Vol. 15, No. 3, 1976, pp. 186–189. As the title already states, p-phenylenediamine can be produced from PET waste which p-phenylenediamine can be used as raw material to produce e.g. azo dyes, diisocyanates or aromatic polyamides. The process, carried out in suspension or solution, consists of the three steps PET degradation with ammonia to terephthaldiamide, the reaction with chlorine to terephthaldichloroamide as well as of a Hofmann rearrangement with sodium hydroxide solution to diamine (with subsequent purification). However, this expensive method with not quite harmless reagents still does not supply an end product but rather a monomeric intermediate product.

DETAILED DESCRIPTION

The invention therefore has the target of making available a novel and at the same time simple method of producing partially aromatic copolyamides in which in particular new sources of raw materials, that is, in particular, waste from polyethylene terephthalate or polyesters based on it can be used. The method should be able to be carried out in a stirred-tank reactor and/or in a reaction extruder.

This problem is solved by the method according to claim 1 and by the polyamide molding materials based on partially aromatic copolyamides according to claim 18 as well as by the use according to claim 19.

Advantageous embodiments of the invention are contained in the subclaims.

Surprisingly, polymeric, oligomeric or monomeric esters from aromatic dicarboxylic acids of any origin, that is, even from polyester waste (e.g. bottle chips or bottle regranulate) were able to be used with the method of the invention as initial product or as raw material. Partially aromatic copolyamide can be after-condensed again after degradation of the polyester used and under almost complete (almost 100%) amidation of the ester groups and the subsequent removal of the split-off alcohols and diols which partially aromatic copolyamide can then be processed further by means of compounding with known additives to ready-to-use polyamide molding materials. In other words, it is thus possible for the first time to produce products with excellent properties from (waste) PET. Furthermore, the method of the invention makes a new and essential contribution to the solution of a current recycling problem concerning polyester in general.

Refer in this connection to DE 42 21 969 A1, according to which a method of producing compatible polymer blends from polyamide and polyester is described in which polyester waste (together with polyamide waste) can also be used. However, according to this method the melt mixture obtained from the raw materials is treated with cyclic carboxylic acid anhydride as well as with diisocyanate and/or diurethane, as a result of which block copolyester amides with rather long sequences form on the phase boundaries, which only improves the compatibility of the blend components. However, a transamidation, that is, a chemical transformation of the polyester blend components like that which takes place in accordance with the invention does not occur thereby.

The fact that polyesters can in principle be converted with diamines is known; however, it could not have been foreseen that polyesters can be completely converted with diamines with the method of the invention and this in a process which can be carried out industrially and also results in utilizable products.

U.S. Pat. No. 4,604,449 describes a method with which polyesteramides are produced from neopentyl glycol polyesters and diamines by a partial amidation and after-condensation. However, the extent of the amidation is only in a range of 5 to 50 molar %, that is, the polyester chains remain—depending on the degree of amidation—preserved to a greater or lesser extent so that the molar mass and its distribution in the initial product influence the end product. The use of polyethyleneterephthalate for this method is explicitly advised against with a reference to the expansion of molecular weight distribution, which is extremely broad in this instance (example 1).

It is all the more surprising that the present method of the invention succeeded in producing good products from PET and in achieving an almost 100% transamidation.

A similar method with somewhat different raw-material components is described in DD 271 823 A3. In this method polyalkylene arylene dicarboxylic acid esters (e.g. PET) are converted with up to 50 molar % aromatic diamines to polyesteramides and after-condensed, creating highly modular, anisotropic polymers. As in the method according to U.S. Pat. No. 4,604,449 this involves only a partial amidation and, moreover, the method is limited to aromatic diamines.

Both DD 271 823 and U.S. Pat. No. 4,604,449 warn against too high a degree of amidation because otherwise products are produced which are non-meltable or meltable only with difficulty and are non-uniform, as is mentioned in example 3 of DD 271 823 A3. Thus, the idea of a complete transamidation of the ester bonds was therefore not rendered obvious.

The method of the invention can be structured into the main method steps of ester amidation (a), alcohol (or diol) removal (b) and after-condensation (c). These three steps are preceded by the melting and homogenizing of the products whereas the after-condensation is followed by the further processing of the partially aromatic copolyamide produced in accordance with the invention. According to the invention the ester amidation takes place in step (a) under intensive mixing and under an atmosphere of inert gas at temperatures of 220 to 300° C. According to the invention the after-condensation takes place at temperatures above 200° C.

According to the invention a ratio of polyester base mole unit to mole diamine in pure form or as mixture of diamines of 1:1 to 1:1.2 is adjusted in step (a).

It turned out that an important condition was the fact that aliphatic polyamides or their oligomers or monomers must be present during the amidation of the esters already in order to avoid the problem of non-uniform products with very high-melting components addressed in the state of the art by the premature formation of copolyamides.

Likewise, customary additives such as chain regulation agents and, if necessary, stabilizers (e.g. antioxidants) are added to the reaction mixture, usually at the beginning already, with regard to the later after-condensation.

In principle, any diamines can be used for the amidation of the esters. Diamines with the structure $H_2N-R^1-NH_2$ are used with preference, in which the group $R^1$ can have the following meanings:

Divalent, aromatic group with 6 to 14 C atoms, or

Divalent, alicyclic group with 6 C atoms, or

Divalent group with the formula $CH_2-R^2-CH_2$ in which $R^2$ is

A divalent, aliphatic group with 2 to 20 C atoms, or

A divalent, alicyclic group with 6 to 20 C atoms, or

A divalent, aromatic group with 6 to 16 C atoms.

The following diamines are especially preferred:

Hexamethylenediamine, m-xylylenediamine, 1,4-bis(aminomethyl)-cyclohexane or

Mixtures of hexamethylenediamine and m-xylylenediamine.

The aliphatic polyamides, their oligomers or monomers which function as cocomponents are preferably PA 46, PA 6, PA 66, PA 610, PA 11 or PA 12, their oligomers or lactam, especially caprolactam. The total amount of these cocomponents in the reaction mixture is preferably 10 to 90% by weight, especially preferably 20 to 85% by weight. Recycling polyamides (ground materials, regranulates, agglomerates) can also be used.

Polymeric, oligomeric or monomeric esters of aromatic dicarboxylic acids of any origin can be considered as new raw material for the partially aromatic copolyamides. Preferred dicarboxylic acid esters are terephthalic acid ester, isophthalic acid ester and 2,6-naphthalene dicarboxylic acid ester. The latter can also be used as copolyesters or even as corresponding polyester amides.

Preferred polyester types are polyethylene-terephthalate (PET), copolyesters (CoPET) based on it, polybutylene-terephthalate (PBT) and polyethylene-naphthalate (PEN).

It makes sense ecologically and is nevertheless economical to use polyester waste and/or regranulates produced from it in the method of the invention. Concrete polyester qualities of this type are e.g.:

Bottle chips or bottle regranulate (PET or e.g. PETI copolyester)

Agglomerates of fiber or foil.

One advantage of the method of the invention is the fact that even mixed waste of polyester and polyamide can be used because the polyamide contained in the mixture can serve as cocomponent. Thus, a fiber agglomerate of PET/PA is also a suitable raw material for the method of the invention.

In order to determine the necessary reaction time for the approximately complete transamidation of the ester groups the following representative experiment was performed: A mixture of 115 g (25 molar % respectively 36% by weight) PET recyclate and 136 g (50 molar % respectively 42% by weight) PA 6 was melted (up to 230° C.) in a glass flask veiled with nitrogen. Then, 70 g (25 molar % respectively 22% by weight) hexamethylenediamine (HMDA) were added into the agitated melt under reflux cooling within 1.5 minutes. During the test small specimens (maximum 1 g each) were removed from the reaction mass before the addition of the HMDA as well as 1 minute, 3 minutes, 5 minutes etc. after the end of the addition of the HMDA. The specimens were investigated by IR spectroscopy. A sharp decrease of the ester bonds became apparent in the specimen 1 minute after the end of the addition of HMDA already but free HMDA was still present. However, no ester bonds were able to be recognized in the specimen 3 minutes after the end of the addition of HMDA already and at the same time no more HMDA was detectable. This furnished the proof that at 230° C. the reaction conversion between polyester and HMDA is practically ended after 3 minutes already. This short reaction time naturally creates the possibility of carrying out this method step in continuous machines with high capacity.

In a preferred embodiment of the invention the method steps ester amidation, removal of the split-off alcohol respectively diol and after-condensation of the low-molecular copolyamide precondensates produced can be carried out in various ways and also separately from each other:

The ester amidation takes place in molten phase and can be carried out both in batches or continuously, preferably in a temperature range of 220 to 300° C. The removal of alcohol respectively diol and after-condensation are possible in the melt or in the solid state, batchwise or continuously in either instance.

A preferred variant of the method of the invention consists in that the precondensate (amidation) is produced in a separate system stage but the method steps of removal of alcohol respectively diol and the after-condensation are subsequently carried out simultaneously in the molten phase in a two-shaft or multi-shaft degassing extruder.

A further advantageous and economical variant of the invention is characterized in that all method steps are carried out continuously and in the molten phase in a coupled extruder combination consisting of a first extruder with melting zone and mixing zone, pressure charging for the addition of molten diamine and reaction zone as well as of a two-shaft or multi-shaft degassing extruder coupled directly on the output side for the method steps of the removal of alcohol respectively diol and melt after-condensation. For the first extruder e.g. two-shaft extruders (of the type ZE/A by Berstorff) are suitable which have a length of more than 20 D (e.g. 33 D) and a ratio of outside screw diameter to inside screw diameter ($D_a/D_i$) of greater than 1.4. The transamidated mixture is supplied after the first extruder, with or without interposed gear pump, to a degassing extruder which can be e.g. a two-shaft extruder (of the type ZE/R; bulk reaction extruder) or a multi-screw extruder or multi-screw reactor (of the type MSE/R by Berstorff). Depending on the task of the degassing extruder, namely preliminary degassing/flashing in the first zone for removing large amounts of alcohol or diol and residual degassing respectively melt after-condensation in the second zone, the degassing extruder is advantageously designed with two stages (with appropriate provisions for vacuum separation), that is, with a pre-vacuum in the first stage and a vacuum of less than 10 mbar abs. in the second stage with the temperature here preferably amounting to a maximum of 330° C. It is advantageous to charge a chain regulation agent, e.g. benzoic acid, into the reaction mixture again at the end of the preliminary vacuum stage.

It turned out in a preliminary extruder test that the diamine can not be added in the amount necessary for the stoichiometry together with the granulate mixture into the entry [feed zone] of the first extruder because otherwise liquid HMDA is separated in the entry zone and is not drawn in too. The HMDA must therefore be applied in molten form via a liquid charging into the polymer melt (that is, into an appropriate extruder zone after the melting zone).

In an especially preferred variant a further extruder is connected directly to the degassing extruder in an expanded extruder combination for further processing in which further extruder the partially aromatic copolyamide is compounded with the known additives (impact-resistance modifiers, reinforcing agents, stabilizers, dyes, pigments, etc.) in order to obtain ready-to-use molding materials. The latter can be subsequently used in granulated and dried form for polyamide usages in areas such as injection molding, extrusion and blow molding.

The following examples explain the invention.

EXAMPLE 1

A mixture of PET (bottle recyclate) and PA 6 in a molar ratio of 1:2 (respectively weight ratio of 1:1.18) together with benzoic acid (as chain regulation agent, 12 g per kg polymer mixture) and disodium phosphate(III) (as antioxidant, 1.2 g per kg polymer mixture) were melted under inert gas in a 6-liter glass flask. Hexamethylene diamine was charged into the melt at approximately 230° C. under agitation and retrograde condensation of evaporating portions in a molar ratio of 1:1 (respectively weight ratio of 1:0.60) relative to PET (that is, precisely the amount stoichiometrically necessary for complete conversion). The precondensate produced was discharged approximately 5 minutes after the end of the addition of HMDA and comminuted after cooling off and solidifying. The ethylene glycol released during the transamidation was subsequently removed in a vacuum drying oven for 4 hours at 180° C. and in a vacuum of below 10 mbar abs. After this treatment stage the material had a melting point (peak) of approximately 260° C. and a relative viscosity of 1.2 (measured 1% (lg/dl) in formic acid). Finally, the material was after-condensed in solid phase under inert gas at 210° C. for 1 hour, which caused the relative viscosity to rise to 2.4. This partially aromatic copolyamide had a melting point of approximately 255° C. and a glass transition temperature of approximately 83° C.

EXAMPLE 2

A mixture of PET (bottle recyclate) and PA 6 in a molar ratio of 1:1 (weight ratio 1:0.59) was melted with the additives cited in example 1 under inert gas in a 6-liter glass flask. HMDA was charged as in example 1 at a melt temperature of 240 to 260° C. and the reaction mixture discharged approximately five minutes after the end of the charging of HMDA, again as precondensate. After the removal of the ethylene glycol, carried out as in example 1, the melting point was approximately 260° C. and the relative viscosity 1.3. After the after-condensation, carried out just as in example 1, the relative viscosity was 2.5, the melting point approximately 265° C. and the glass transition temperature approximately 88° C.

EXAMPLE 3

HMDA was charged in a 6-liter glass flask into a mixture of PET (bottle recyclate) and PA 66 in a molar ratio of 1:1 (weight ratio 1:1.18) with the additives cited in example 1 under inert gas at 280 to 300° C. as in examples 1 and 2. Approximately 5 minutes after the end of the charging of HMDA the precondensate produced was discharged. After the removal of the ethylene glycol, carried out as in example 1, the melting point was approximately 260° C. and the relative viscosity 1.2. After the after-condensation, carried out as in example 1, the viscosity was 2.3, the melting point approximately 255°C. and the glass transition temperature approximately 104° C.

EXAMPLE 4

In this example the amidation was carried out in an extruder. The start was made from a homogeneous co-extrudate of 75% a by weight PET (bottle recyclate) and 25% by weight PA 6 (corresponding to 64 molar % PET and 36 molar % PA 6). This material was melted in a two-shaft extruder (of the Berstorff ZE 40A type) at 300° C. After the melting zone 0.5 kg HMDA per kg melt was charged into the melt via a liquid charging (dosing unit) under pressure, corresponding to approximately 110% of the amount required for a complete amidation of the polyester. The throughput was selected in such a manner, taking into consideration the extruder length and volume, that after the liquid charging a residence time of at least 3 minutes remained for the reaction mixture for the transamidation of the ester bonds. The precondensate produced was cooled off in a water bath and then comminuted (it was not yet capable of being granulated on account of the low viscosity), dried and freed of residual glycol as in the preceding examples. No ester bonds were able to be demonstrated any more in this precondensate with IR spectroscopy, that is, the amidation had completely proceeded. The melting point of the precondensate was approximately 290° C. After the after-condensation, carried out as in the preceding examples, the melting point even rose to approximately 340° C., corresponding to the relatively low amount of aliphatic polyamide in the initial mixture.

EXAMPLE 5

A mixture of 25% by weight PET (bottle recyclate) and 75% by weight PA 6 (corresponding to 16.5 molar % PET and 83.5 molar % PA 6) was melted in a manner similar to that of example 4 under the addition of lubricant and antioxidant in a two-shaft extruder and homogenized over a sufficiently long extruder length. 0.165 kg HMDA per kg melt was introduced into the melt by a liquid charging (dosing unit) under pressure, that is, approximately 110% of the amount theoretically required for amidation of the polyester. The throughput was selected in analogy with example 4 in such a manner that a residence time of at least 3 minutes remained after the liquid dosing for the reaction mixture for transamidation. The precondensate produced was already granulatable and free of ester groups, according to the IR spectrum. After the treatment of the precondensate in solid phase just as in the above examples the material had, after the removal of glycol, a melting point of approximately 210° C. and a relative viscosity of 1.5. A melting point of approximately 220°C. and a relative viscosity of 2.1 were measured on the after-condensed material.

EXAMPLE 6

A homogeneous co-extrudate of 45% by weight pure ("virgin") PET (pigment-free (ultrabright), intrinsic viscosity 0.78 dl/g) and 55% by weight PA 66 was melted in a two-shaft extruder as described in example 4; the temperature of the melting zone was 290° C. After the melting zone 0.3 kg molten HMDA was charged per kg melt, that is, 110% of the amount required for ester amidation. The throughput was selected in such a manner, taking into consideration the extruder length and volume, that after the addition of HMDA the residence time was still at least 3 minutes. A precondensate was produced similarly to example 4 which was not yet able to be granulated and which was after-condensed after comminuting and drying as described in the preceding examples under further splitting off of glycol. The melting point rose thereby to approximately 290° C. A distinctly lower-melting final product was obtained in example 3—starting from almost the same ratio of PET : PA 66. This is explained in addition to the more homogeneous course of reaction in the extruder in particular by the fact that in the present example 6 pure PET was converted [reacted] whereas the bottle recyclate (example 4) contained amounts of polyethylene-isophthalate.

We claim:

1. A method of producing partially aromatic copolyamides, comprising:
   (a) reacting polymeric esters of aromatic dicarboxylic acids in the presence of aliphatic polyamides with at least one diamine with intensive mixing and at a temperature between 220 and 300° C. in the presence of an inert gas until amidation of the ester groups is substantially complete, thereby forming a precondensate;

(b) removing alcohols and diols generated during said reacting step; and (c) after-condensing said precondensate at a temperature above 200° C., thereby forming partially aromatic copolyamides.

2. The method according to claim 1, wherein the initial material to be used in step (a) containing polyester material is melted and homogenized.

3. The method according to claim 2, wherein the ratio of polyester base mole unit to mole diamine, in pure form or as a mixture of diamines, is 1:1 to 1:1.2 in step (a).

4. The method according to claim 2, wherein the method steps of ester amidation, removal of alcohols and after-condensation are performed separately, the ester amidation occurs in molten phase, and the other two method steps are performed in molten or solid phase.

5. The method according to claim 2, wherein the ester amidation occurs in a stirred-tank reactor with reflux condenser under inert gas by the addition of molten diamine to a melt of the other components at temperatures between 220 and 300° C., and the method steps of removal of alcohols and after-condensation are performed simultaneously in a two-shaft or multi-shaft degassing extruder.

6. The method according to claim 2, wherein all method steps are performed continuously and in melt phase in an extruder combination consisting of (i) a first extruder with melt- and mixing zone, dosing under pressure for the addition of molten diamine, and reaction zone, and (ii) a two- or multi-shaft degassing extruder for the method steps of removal of alcohols and diols and of melt after-condensation.

7. The method according to claim 5 wherein the degassing extruder is designed with two stages and (i) first a preliminary degassing for removing large amounts of alcohols and diols is performed in a pre-vacuum zone and (ii) a residual degassing and the melt after-condensation is performed in a second zone, optionally after the addition of further chain regulation agent to the reaction mixture, in a vacuum of less than 10 mbar abs. and a maximum temperature of 330° C.

8. The method according to claim 5 wherein a further extruder is directly connected to the degassing extruder for compounding the partially aromatic copolyamide.

9. The method according to claim 1 wherein (co)polyterephthalic acid esters, (co)polyisophthalic acid esters, (co)poly-2,6-naphthalene dicarboxylic acid esters or corresponding polyesteramides and oligomeric and monomeric fragments thereof are used as polymeric esters of aromatic dicarboxylic acids.

10. The method according to claim 9, wherein polyethyleneterephthalate or copolyesters based on it or polybutyleneterephthalate are used as polymeric esters.

11. The method according to claim 1, wherein either polymerized polyester raw material or recyling polyesters are used as polymeric esters.

12. The method according to wherein at least one diamine of the formula $H_2N-R^1-NH_2$ is used for ester amidation in which $R^1$ represents A divalent, aromatic group with 6 to 14 C atoms or A divalent, alicyclic group with 6 C atoms or A divalent group of the formula $CH_2-R^2-CH_2$ in which $R^2$ represents A divalent, aliphatic group with 2 to 20 C atoms or A divalent, alicyclic group with 6 to 20 C atoms or A divalent, aromatic group with 6 to 16 C atoms.

13. The method according to claim 12, wherein the diamines are selected from the group consisting of hexamethylenediamine; m-xylylenediamine; 1,4-bis(aminomethyl)-cyclohexane; and mixtures of hexamethylenediamine and m-xylylenediamine.

14. The method according to claim 2 wherein the amount of aliphatic polyamides in the reaction mixture is 10 to 90% by weight.

15. The method according to claim 14, wherein PA 46, PA 6, PA 610, PA 66, PA 11 or PA 12 are used as aliphatic polyamides.

16. The method according to claim 14, wherein recycling polyamides are used as aliphatic polyamides.

17. The method according to claim 14, wherein the aliphatic polyamides are replaced in part or entirely by caprolactam.

18. The method according to claim 14 further comprising:

(d) subjecting said partially aromatic copolyamides to a process selected from the group consisting of extrusion blow molding and injection molding.

19. The method according to claim 2 wherein the amount of said aliphatic polyamides is 20 to 85% by weight.

* * * * *